(12) United States Patent
Koeppel et al.

(10) Patent No.: US 10,719,820 B2
(45) Date of Patent: *Jul. 21, 2020

(54) SYSTEMS AND COMPUTER-IMPLEMENTED PROCESSES FOR DEPOSITING, WITHDRAWING, AND REUSING CURRENCY FOR PURCHASE TRANSACTIONS USING AN INTELLIGENT TELLER MACHINE

(71) Applicant: Capital One Services, LLC, McLean, VA (US)

(72) Inventors: Adam R. Koeppel, Washington, DC (US); Alex Leo Niderberg, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,249

(22) Filed: Apr. 10, 2019

(65) Prior Publication Data

US 2019/0236572 A1    Aug. 1, 2019

Related U.S. Application Data

(63) Continuation of application No. 14/829,014, filed on Aug. 18, 2015, now Pat. No. 10,339,507.

(60) Provisional application No. 62/038,479, filed on Aug. 18, 2014.

(51) Int. Cl.
| | |
|---|---|
| *G06Q 40/02* | (2012.01) |
| *G06Q 20/10* | (2012.01) |
| *G07F 19/00* | (2006.01) |
| *G06Q 20/40* | (2012.01) |
| *G06Q 30/06* | (2012.01) |

(52) U.S. Cl.
CPC ....... *G06Q 20/1085* (2013.01); *G06Q 20/405* (2013.01); *G06Q 30/06* (2013.01); *G06Q 40/02* (2013.01); *G07F 19/203* (2013.01)

(58) Field of Classification Search
CPC ....... G06Q 20/405; G06Q 30/06; G06Q 40/02
USPC .......................................................... 705/43
See application file for complete search history.

(56) References Cited

U.S. PATENT DOCUMENTS

| | | | |
|---|---|---|---|
| 5,992,570 | A | 11/1999 | Walter et al. |
| 8,032,415 | B2 | 10/2011 | Sanders et al. |
| 8,181,856 | B1 | 5/2012 | Folk et al. |
| 8,210,429 | B1 | 7/2012 | Bohen et al. |
| 2003/0004878 | A1* | 1/2003 | Akutsu .............. G06Q 20/1085 705/43 |

(Continued)

OTHER PUBLICATIONS

Communication pursuant to Article 94(3) EPC for European Application No. 15 834382.2-1213, dated Jan. 3, 2020 (7 pages).

*Primary Examiner* — Robert R Niquette
*Assistant Examiner* — Liz P Nguyen
(74) *Attorney, Agent, or Firm* — Pillsbury Winthrop Shaw Pittman LLP

(57) ABSTRACT

Systems and methods are disclosed for the deposit, withdrawal, and reuse of currency for transactions. According to disclosed embodiments, an intelligent teller machine (ITM) is configured to receive currency as payment for a transaction, to calculate and dispense any change due, and to request that the net value of the transaction (e.g., the revenue) be deposited into the financial account of the business. The currency received by the ITM is also available to make change for future purchase transactions.

20 Claims, 5 Drawing Sheets

(56) References Cited

U.S. PATENT DOCUMENTS

| | | | |
|---|---|---|---|
| 2004/0084521 A1* | 5/2004 | Nagayoshi | G07F 19/20 235/379 |
| 2005/0010525 A1 | 1/2005 | Ross et al. | |
| 2008/0087720 A1* | 4/2008 | Levitov | G06Q 20/4014 235/379 |
| 2012/0136779 A1 | 5/2012 | Nonaka | |
| 2015/0254770 A1 | 9/2015 | Bondesen et al. | |

* cited by examiner

SYSTEMS AND COMPUTER-IMPLEMENTED PROCESSES FOR DEPOSITING, WITHDRAWING, AND REUSING CURRENCY FOR PURCHASE TRANSACTIONS USING AN INTELLIGENT TELLER MACHINE

CROSS REFERENCE TO RELATED APPLICATIONS

This application is a continuation of and claims the benefit of U.S. patent application Ser. No. 14/829,014, filed Aug. 18, 2015, which is entitled to and claims the benefit of priority from U.S. Provisional Application No. 62/038,479 filed Aug. 18, 2014, the entire contents of both of which are expressly incorporated herein by reference.

TECHNICAL FIELD

The disclosed embodiments generally relate to the deposit, withdrawal, and reuse of currency for transactions. In particular, disclosed embodiments relate to receiving physical payment (e.g., currency, etc.) for purchases made at a business at a self-servicing system and directly depositing the value of that physical payment into the business' financial account.

BACKGROUND

Any business that accepts cash as a form of payment is subject to several dangers and delays. Even though many businesses accept cash payments from its customers, very few businesses operate with cash outside of that context. Thus, businesses deposit the received cash with a financial institution (e.g., a bank) so that the money becomes available for use in electronic commerce, payroll, etc. To make a deposit, a business must first transport the cash to a financial institution. For efficiency, the business often stores received cash until a sufficiently large amount has been accumulated. And to deposit the cash, an employee must physically carry the cash from the business to the financial institution for deposit, making that person a potential target for crime. Similarly, business employees often also make regular trips to the financial institution to withdraw cash in order to ensure an adequate supply of cash to make change for the purchases. Again, the person physically carrying the cash from the financial institution to the business may also be at risk. These procedures are inconvenient because businesses consume valuable resources in making trips to the financial institution, the cash and the person transporting the cash are at an increased risk during these trips, cash stored at the business is generally an inaccessible asset until it is deposited in the business's financial account and becomes available for electronic exchanges, cash stored at the business is relatively insecure as compared to deposited money, and the business owner may be forced to wait for days to have the revenue generated by cash payments reflected in their accounts.

While some automated teller machines (ATMs) can accept cash deposits. ATMs are not always available in retail environments. Deposits and withdrawals to ATMs outside of the retail environment pose the same problems noted above with regard to deposits and withdrawals at financial institutions. Even when such machines are located within a business, they are not practical for use for deposits and withdrawals for the business owner. The business owner cannot use it to deposit payments and withdraw change for every transaction because the ATMs require entry of account information (e.g., swiping of a debit card and entry of a pin number) for each transaction, ATMs may not accept or pay out small denominations required for transactions (e.g., only accepts or pays out amounts in $5 or more increments), and ATMs are often located far from where the transaction occurs (e.g., cash registers may not be located near the ATMs).

ATMs are also inconvenient for bulk deposits. ATMs are not equipped to rapidly accept large amounts of cash, so the transaction may take a long time for the ATM to physically accept the cash being deposited. Additionally, there is often only a single ATM at a location, so large deposits or withdrawals may not be possible if the ATM cash vault does not have room to accept the full deposit or does not have enough cash to complete the requested withdrawal.

Furthermore, cash payments are typically mediated in retail environments through cash management systems (e.g. traditional cash registers, point of sale (POS) systems, self-checkout systems) that enable users to record sales and store received cash payments. Such systems, however, are not connected to retailers' financial accounts and thus do not have any way of making the revenue generated by cash payments accessible to the business for electronic commerce.

Accordingly, it is desirable to provide systems and processes that directly deposit the revenue generated by physical currency payments as soon as they are made. It is also desirable to provide systems and processes that reuse received currency to make change and to reflect such reuse in the business' financial account.

SUMMARY

Disclosed embodiments include systems and processes for providing intelligent teller machines to directly deposit revenues and/or payments when physical currency is received, reusing received currency to make change, and updating a business' financial account to reflect these transactions.

In certain embodiments, an intelligent teller machine (ITM) system is provided. The ITM system may include a currency acceptor, a memory storing instructions, and at least one processor configured to execute the instructions in the memory. The instructions may include instructions to receive an indication of a monetary amount to receive, receive currency inserted via the currency acceptor, and compare a value of currency received and the monetary amount to receive. The instructions may also include instructions to determine the value of currency received is not less than the monetary amount to receive and send a request to deposit a value equal to the monetary amount to receive into a financial account based on the determination. The instructions may also include instructions to verify that each unit of currency received is valid. The ITM system may also include a currency dispenser and a currency repository holding an amount of currency and the instructions may further include instructions to store the received currency in the currency repository and dispense currency equal in value to the change due amount from the currency repository via the currency dispenser. The instructions may also include instructions for transmitting a request for servicing of the ITM system, for example, when the amount of currency in the currency repository is insufficient to service a transaction or when the currency repository is too full to service further transactions.

In certain embodiments, an ITM system is provided with a memory storing instructions that include instructions to receive an indication of a monetary amount to receive for each of a plurality of transactions and receive currency inserted via the currency acceptor for each of the plurality of transactions. In certain embodiments, the instructions may include instructions to compare a value of currency received and the monetary amount to receive for each of the plurality of transactions, determine the value of currency received is not less than the monetary amount to receive for each of the plurality of transactions, and send a request to deposit a value corresponding to the sum of the monetary amounts to receive for the plurality of transactions into a financial account based on the determinations.

In certain embodiments, a computer-method is provided comprising storing, in at least one memory, financial account information associated with a business account with a financial service provider and determining, via at least one processor, a purchase price for a customer purchase of a good or service offered by the business. The method may further comprise determining, via the at least one processor, that sufficient currency to pay for the customer purchase is received at an intelligent teller machine associated with the financial service provider and transmitting, by the processor, a request to deposit a value equivalent to the purchase price in the financial account corresponding to the business information, the request including the stored bank account information. In certain embodiments, the method may include verifying the request before transmitting the request. In certain embodiments, the method may include verifying the received currency if is valid. In certain embodiments, the method may include determining that payment in excess of the purchase price was received and may further include dispensing currency equivalent in value to the determined value of the payment in excess of the purchase price.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the methods relating to the disclosed embodiments may be implemented in system environments outside of the exemplary system environments disclosed herein.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Generally, disclosed embodiments are directed to systems and methods that dynamically reflect revenue flow in a business' financial account resulting from transactions conducted using physical currency. For ease of discussion, embodiments may be described in connection with deposits into and withdrawals from financial accounts (e.g., checking accounts, savings accounts, etc.). Moreover, it is to be understood that disclosed embodiments are not limited to transactions involving paper bills and, in fact, may be applied to any physical embodiment of currency and/or cash substitutes (e.g., coins, traveler's checks, Casascius Bitcoins™, etc.). Further, steps or processes disclosed herein are not limited to being performed in the order described, but may be performed in any order, and some steps may be omitted, consistent with the disclosed embodiments.

Figure 1:
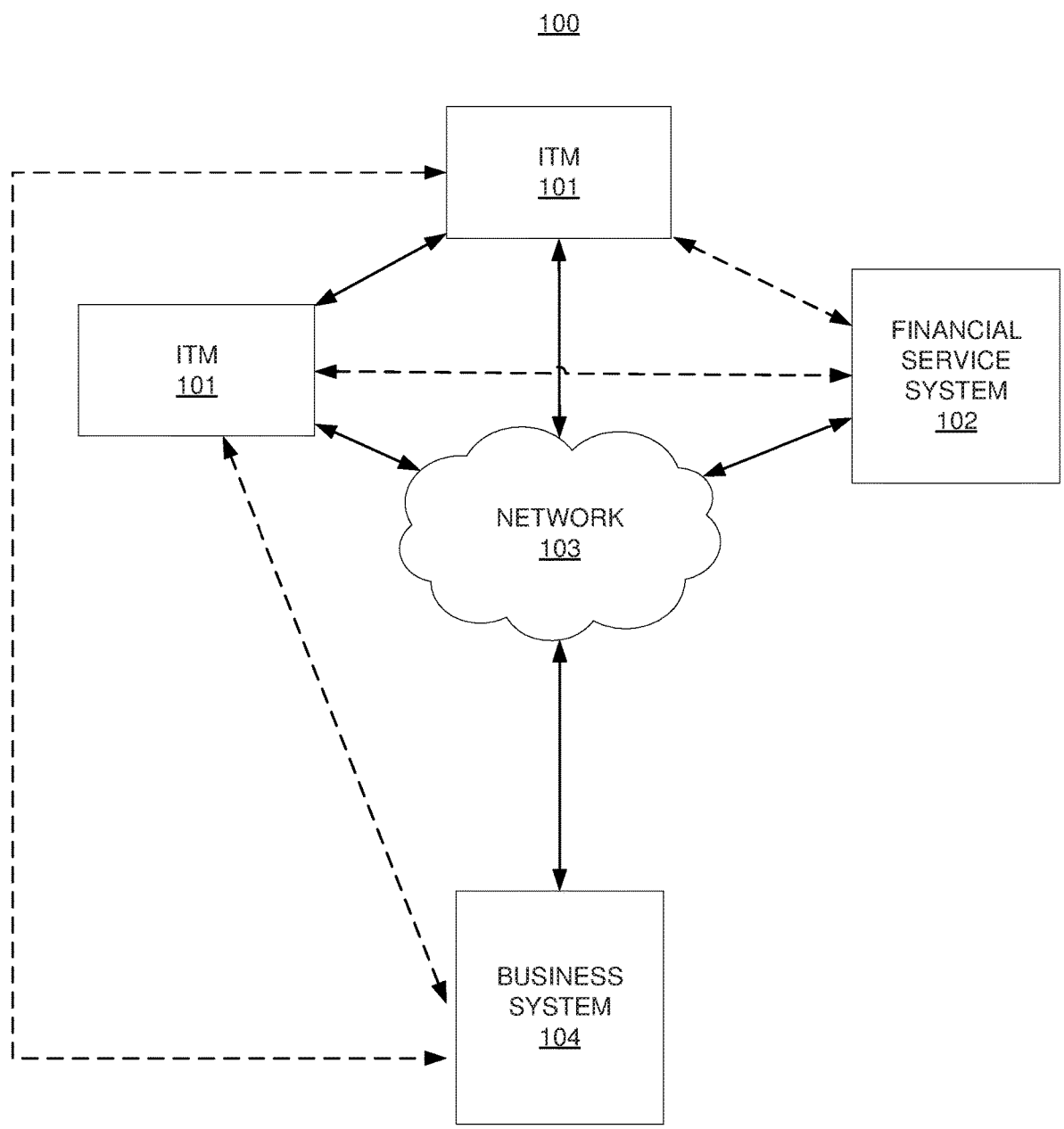
FIG. 1 is an exemplary system that may be used to implement the disclosed embodiments.

FIG. 1 is an exemplary system 100 configured to provide one or more aspects of the disclosed embodiments. The components and arrangements shown in FIG. 1 are not intended to be limiting to any disclosed embodiment, as the components used to implement the processes and features disclosed here may vary.

According to certain disclosed embodiments, system 100 may include one or more Intelligent Teller Machines (ITMs) 101, one or more financial service systems 102, and one or more business systems 104 connected, for example, via one or more networks 103.

ITM 101 may be located in a business. In certain embodiments, multiple ITMs 101 may be located within a single business and may be interconnect (e.g., via network 103). ITM 101 may be provided by or operated on behalf of a financial service provider associated with financial service system 102. In certain embodiments, ITM 101 may not be provided by the same financial service provider associated with financial service system 102, but an account holder of the financial service provider associated with financial service system 102 may be capable of accessing account information and/or conducting transactions via ITM 101 (e.g. the financial service provider may not own ITM 101, but account holders of the financial service provider may still be able access their accounts via ITM 101).

ITM 101 may be associated with at least one financial account (e.g. checking or savings account) of the business serviced by the financial service provider that provides financial service system 102. ITM 101 may be configured to transmit requests for account deposits and withdrawals to financial service system 102, for example, via network 103, or via a direct connection to financial service system 102.

Network 103 may be any type of network that provides communications, exchanges information, and/or facilitates the exchange of information between ITM 101 between ITM 101, business system 104, and/or financial service system 102. As noted above, more than one ITM 101 may be located within a single business, and network 103 may be used to interconnect the multiple ITMs 101. In one embodiment, network 103 may be the Internet, a Local Area Network, or other suitable connection(s) that enables system 100 to send and receive information between the components of system 100. In certain embodiments, network 103 may be a secure connection suitable for the secure transmission of highly confidential information between the components of system 100. In certain embodiments, direct connections between ITM 101 and business system 104 and/or between ITM 101 and financial service system 102 may replace and/or be provided in addition to the connections provided by network 103.

Financial service system 102 may be a system that is associated with a financial service provider, such as, for example, a bank, lender, merchant, or other entity that provides financial accounts.

Financial service system 102 may be configured to receive requests for account deposits and withdrawals from ITM 101, for example, via network 103. Financial service system 102 may also be configured to transmit customer account information to ITM 101, for example, via network 103.

In certain embodiments, business system 104 may include databases and/or operating systems used in the management of a business. Business system 104 may include, for example, one or more price databases, point of sale systems, accounting systems, inventory systems, payroll systems, and/or other business operation systems.). In certain embodiments, business system 104 may be configured to communicate with ITM 101, for example, via network 103 and/or via direct connection(s). For example, in certain embodiments, business system 104, or parts of business system 104, may be communicatively connected to and otherwise accessible by ITM 101 (see, e.g., the exemplary configuration for ITM 101 described below, wherein ITM 101 is communicatively connected to business system 104 to function as the business' point of sale system. One of ordinary skill in the art would recognize beneficial configurations, connections, and/or integrations of the functionalities of business system 104 and ITM 101.

In certain embodiments, one or more ITMs 101 may be located within a single business. ITM 101 may be integrated with and/or configured to access various business databases and systems (e.g., business system 104, which may include one or more price databases, accounting systems, inventory systems, payroll systems and/or other systems), such that ITM 101 may replace and/or complement some or all of a business' existing operating and computer systems. As described further herein (see, e.g., FIG. 2 and related text), ITM 101 may be integrated with certain functionalities of business system 104 such that ITM 101 may operate as the business' point of sale system.

ITM 101 may be owned or leased by the business, but as explained herein, once currency is received by ITM 101, the currency may be considered property of the financial service provider associated with financial service system 102 because, for example, a corresponding electronic deposit may be made in the business's financial account. Since the currency may be considered owned by the financial service provider associated with financial service system 102, it is contemplated that ITM 101 may be serviced periodically to remove currency and/or replenish the currency supply by, for example, a representative of the financial service provider associated with financial service system 102.

ITM 101 may be configured to operate as a business' point of sale system and facilitate purchase transactions by, for example, identifying item(s) a customer wishes to purchase (e.g., scanning UPC codes and the like), identifying the price(s) of the item(s) (e.g., accessing business databases reflecting product prices), calculating the amount due for the item(s) (including any taxes, discounts, coupons, rewards programs, etc.), receiving payment for the purchase, determining the change due, and providing the change due. The receipt of currency and the disbursement of change may be conducted as account transaction(s) that may be reflected on the business' bank account. As one of ordinary skill in the art would recognize, ITM 101 may be configured to conduct the deposit and/or withdrawal transactions associated with a purchase transaction in several different ways. For example, each receipt of currency and each disbursement of currency may be treated as separate deposit and withdrawal transactions. As another example, each purchase transaction may be treated as a single net deposit (e.g., net deposit=amount received−change due) into the business' financial account. Purchase transactions may also be grouped together such that a net deposit or withdrawal may be conducted after a certain number of purchase transactions, a net deposit or withdrawal may be conducted at certain time intervals (e.g., every hour, at the close of business, etc.), and/or a net deposit may be conducted after a certain deposit or withdrawal amount is exceeded (e.g., after $100 net is received or withdrawn, etc.). As a further example, purchase transactions may also be grouped together in batches such that a deposit and withdrawal (or a net deposit) for each purchase transaction may be transmitted at the same time (e.g., after a certain number of purchase transactions, at certain time intervals, and/or when the total value of the deposits and/or withdrawals exceeds a certain amount). These examples are not exhaustive and other deposit/withdrawal configurations may be used.

As an example and for illustrative purposes only, considering an ITM configured to treat each purchase transaction as comprising a deposit transaction (with the receipt of currency as payment) and a withdrawal transaction (with the dispensing of any change due), when the payment received by ITM 101 is in the form of currency (or a cash substitute), ITM 101 may be configured to store the currency in a repository and may be configured to request a deposit of a value equal to the amount received be made to the business' financial account. Once the currency is received by ITM 101, the currency may be considered the property of the financial service provider associated with financial service system 102. The currency may be considered received at various stages in the purchase transaction, for example, when the currency is inserted into and accepted by currency acceptor 203 (described below), when the currency is deposited in currency repository 205 (described below), when the request for a deposit transaction is sent by ITM 101 to financial service system 102, when the deposit is conducted and/or the request is acknowledged by financial service system 102, etc.

Currency received by ITM 101 may become property of the financial service provider associated with financial service system 102, even though the currency resides in ITM 101 physically located on the business' premises. The value(s) of the currency deposited into the repository may be reflected in the financial account of the business and may be available for the business to conduct electronic commerce (one of ordinary skill in the art would recognize that there may be a delay between the receipt/disbursement of the currency by ITM 101 and the reflection of the value of the deposit/withdrawal on the business' financial account).

When currency is dispensed, ownership of the currency may be transferred from the financial service provider associated with financial service system 102 to the business (and may be further transferred, for example, when the currency is given to a customer to whom change is due). The change in ownership from the financial service provider to the business may be reflected as a withdrawal on the business' financial account. The currency may be considered dispensed at various stages in the purchase transaction, for example, when the currency is dispensed from currency dispenser 204 (described below), when the currency is dispensed from currency repository 205 (described below), when the request for a withdrawal transaction is sent by ITM 101 to financial service system 102, when the withdrawal is conducted and/or the request is acknowledged by financial service system 102, etc.

ITM 101 may also be configured to facilitate deposit and/or withdrawal transactions in relation to receipts and/or disbursements of currency that may not be directly related to a purchase transaction. For example, as described below with respect to FIG. 5 and related text, physical transfers of currency between multiple ITMs 101 within a business may be treated as deposit and withdrawal transactions. ITM 101 may be configured to allow receipt of and/or disbursement of currency unrelated to a purchase transaction (for example, withdrawing funds for use as petty cash), and those deposits and disbursements may be treated as deposits and withdrawals on the business' financial account. ITM 101 may also be configured to address other transactions (e.g., for the return of items by a customer, cash advances for an employee, etc.) that may result in a deposit and/or withdrawal on the business' financial account.

ITM 101 may also be configured to allow the user to obtain information about the business' financial account (e.g., review current balance, review account statements, etc.), with or without conducting a purchase transactions. As noted above, ITM 101 may be integrated into and may replace one or more business operating and/or computer systems, and one of ordinary skill in the art would understand how to ITM 101 may be configured to provide the functionality of the business operating and/or computer systems that ITM 101 may replace (e.g., configured with inventory management and supply ordering functionality, configured with various reporting functionality, etc.).

Figure 2:
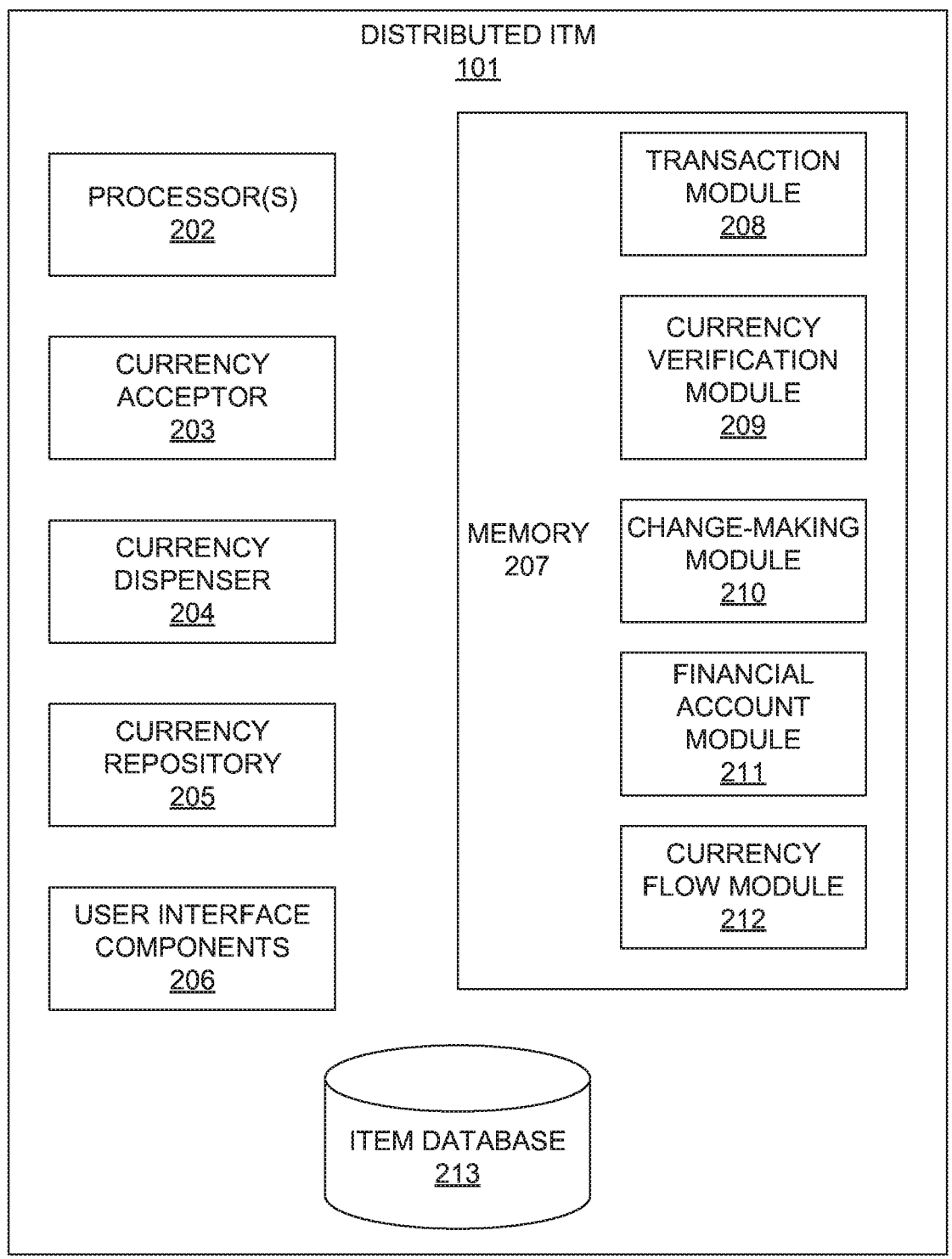
FIG. 2 is an exemplary Intelligent Teller Machine (ITM) configured to provide one or more aspects of the disclosed embodiments.

FIG. 2 is an exemplary ITM 101 consistent with disclosed embodiments. In one embodiment, ITM 101 may include one or more processors 202, one or more currency acceptors 203, one or more currency dispensers 204, one or more currency repositories 205, one or more memory devices such as memory 207, one or more user interface components 206, and/or one or more item databases 213.

Processor(s) 202 may be configured to execute instructions to provide processes and functionality as disclosed herein. Processor(s) 202 may be one or more known processing devices, such as a microprocessor from the Pentium™ family manufactured by Intel™ or the Turion™ family manufactured by AMD™. Processor(s) 202 may include a single core or multiple core processor system that provides the ability to perform parallel processes simultaneously. For example, processor(s) 202 may be a single core processor that is configured with virtual processing technologies known to those skilled in the art. In certain embodiments, processor(s) 202 may use logical processors to simultaneously execute and control multiple processes. Processor(s) 202 may implement virtual machine technologies, or other similar known technologies to provide the ability to execute, control, run, manipulate, store, etc. multiple software processes, applications, programs, etc. In another embodiment, processor(s) 202 may include a multiple-core processor arrangement (e.g., dual or quad core) that is configured to provide parallel processing functionalities to allow ITM 101 to execute multiple processes simultaneously. One of ordinary skill in the art would understand that other types of processor arrangements could be implemented that provide for the capabilities disclosed herein.

Currency acceptor 203 may be any device that accepts and has the capability to accept one or more types of currency, e.g. paper bills, coins, etc. Currency acceptor 203 may comprise one or more devices that validate the currency (e.g., determines the cash is legal tender, too damaged to accept, etc.). Currency accepter 203 may also comprise one or more devices that count or otherwise determines the sum value of the deposited currency.

Currency dispenser 204 may be any device that can dispense currency, e.g., the physical currency stored in currency repository 205. Currency dispenser 204 may include one or more devices that count the value of the currency being dispensed.

Currency repository 205 may be any device that stores currency. Currency repository 205 may store currency sorted by, for example, denomination. In one embodiment, currency repository 205 may comprise one or more storage cassette vaults. Currency repository 205 may also comprise a rejection repository where unfit currency (e.g., counterfeit, damaged, etc.) could be stored.

ITM 101 may include user interface components 206 that may provide interfaces to one or more input devices, such as one or more display screens (e.g., a FOS monitor, a customer pole display, etc.), touch-screen keyboards, scanners (e.g., bar code scanners such as embedded bar code scanners or handheld bar code scanners), receipt printers, signature capture devices, and the like, that may enable ITM 101 to receive data from the user and provide notifications to the user.

ITM 101 may include one or more memories 207. Memory 207 may store instructions for transaction module 208, currency verification module 209, change-making module 210, sale deposit module 211, and currency flow module 212.

Transaction module 208 may contain instructions that, when executed by processor(s) 202, may receive identification data about an item to be purchased and may retrieve pricing and/or other data about the item (e.g., information regarding taxation of the item, discounts for the item, and information about the item that may not affect the price) from item database 213. Transaction module 208 may also contain instructions that, when executed by processor(s) 202, may receive user-entered information regarding coupons, gift certificates, and/or other discount information that may affect the amount due for the transaction. Transaction module 208 may also contain instructions that, when executed by the processor, calculates the total amount owed by a customer for the item(s) he or she wishes to purchase. In certain embodiments, transaction module 305 may simply receive a pre-calculated amount due entered by a user, e.g., entered by a cashier.

Currency verification module 209 may contain instructions that, when executed by processor(s) 202, may validate physical currency received via the currency acceptor and/or may determine the total value of the currency. In one embodiment, for example, currency verification module 208 may reject units of currency found to be invalid. Invalid currency may be returned to the user (e.g., to the cashier or the customer of the business) or it may store invalid currency in a rejection repository. Currency verification module 209 may compare the value of the received and/or valid currency to the amount due (e.g., as calculated by transaction module 208). If the amount due exceeds the amount received, currency verification module 209 may transmit a notification to one or more user interface components 206 which may prompt the user to insert additional currency. In certain embodiments, currency verification module 208 may transmit a notification which may prompt a user to provide account information in order to complete the transaction via another method of payment. In this way, currency verification module 208 may prompt a user to pay for the balance due using, for example, a credit or debit card. If the amount received exceeds the amount due, currency verification module 209 may transmit the value of the excess amount (e.g., the amount due) to change-making module 210.

Change-making module 210 may contain instructions that, when executed by processor(s) 202, may determine the change due for a pending sale and may dispense change to the user. In certain embodiments, change-making module may calculate the amount due by comparing the amount received (e.g., as calculated by currency verification module 209) to the amount due (e.g., as calculated by transaction module 208). In certain embodiments, change-making module 210 may determine the change due based on change due data received from currency verification module 209. Change making module 209 may be configured to dispense the amount due as currency, transmitting instructions to currency dispenser 204 to dispense currency from currency repository 205. In certain embodiments, change-making module 210 may be configured to deposit the change due in the financial account of the customer making the purchase. In such an embodiment, change-making module 210 may request the customer's financial account information (e.g., requesting the customer swipe his or her debit card and enter a pin number) and then may send a request to financial service system 102 to deposit the value of the change due into the customer's account.

Financial account module 210 may contain instructions that, when executed by processor(s) 202, may send a request to financial service system 102 to deposit an amount received to the financial account (e.g., checking account, savings account, etc.) of the business owner. In certain embodiments, financial account module 210 may contain instructions that, when executed by processor(s) 202, may send a request to financial service system 102 to withdraw an amount from the financial account of the business. As described above with respect to ITM 101 of FIG. 1, one of ordinary skill in the art would understand when such deposit and/or withdrawal requests would be transmitted whether related to a purchase transaction or not. Financial account module 210 may store the account information (e.g., routing and account number) for the financial account of the business. The account information may be transmitted with a deposit or withdrawal request so that financial service system 102 may deposit or withdrawal funds in the account of the business without requiring the user to enter the account information for each transaction. In certain embodiments, financial account module 210 may store and transmit other identification information that allows financial service system 102 to recognize and associate the request with the financial account of the business. For ease of reference, this description only references account information, and one of ordinary skill in the art would recognize how other identification information may be associated with and used in place of or in addition to account information.

In certain embodiments, financial account module 210 may require a user to enter confirmation information for some or all withdrawal and/or deposit requests. Confirmation information may include entering confirmation code (e.g., entering a PIN, CCV number, etc.), re-entry of the account information, etc. For example, in certain embodiments, financial account module 210 may be configured to transmit a request for a deposit associated with a purchase transaction without requiring the user to enter confirmation information, but account module 210 may be configured to require the user to enter a PIN, for example, for a user-initiated withdrawal that is not associated with a purchase transaction. In certain embodiments, financial account module 210 may be configured to confirm that the confirmation information entered by the user is correct before transmitting the request to financial service system 102. In certain embodiments, financial account module 210 may be configured to transmit the confirmation information with the request without confirming that the confirmation information is correct. One of ordinary skill in the art would understand beneficial configurations for requiring user-entered confirmation information before transmission of the request to financial service system 102.

Currency flow module 212 may contain instructions that, when executed by processor(s) 202, may check that the supply of currency for change-making remains adequate across system 100. In certain embodiments, currency flow module 212 may monitor the amount of currency and/or the amount of various denominations of currency in currency repository 205. In one embodiment, multiple ITMs 101 may be connected to one another and when one or more ITMs 101 requires a currency migration (e.g., when currency repository 205 is too full or insufficiently stocked in one or more denominations), currency flow module 212 may send a request for currency migration to one or more connected ITMs 101 (e.g., checking if another ITM 101 has space in its currency repository 205 for additional currency or if another ITM 101 has extra currency that it can dispense). If currency migration is possible among connected ITMs 101, the currency flow module 212 of the ITM 101 requiring currency migration (or currency flow module 212 the ITM 101 capable of supplying the needed space or currency to the ITM 101 requiring it) may send a notification to the user (e.g., via user interface components 206) that currency migration may be needed, and may further indicate the other ITM 101 able to facilitate the migration. For example, if currency repository A of ITM A is too full, currency flow module A may send a request to currency flow module B of ITM B, which may cause currency flow module B to check the space available in currency repository B. If space is available, currency flow module B may send notification to currency flow module A of ITM A that ITM B may accept a deposit of the excess currency from ITM A. ITM A (and/or ITM B) may send a notification to the user (e.g., via user interface components 203) requesting that the user withdraw currency from ITM A and deposit it in ITM B. One of ordinary skill in the art would understand how to determine the parameters for a currency migration (e.g., the parameters associated with a currency repository that may be considered too full or insufficiently funded, the parameters associated with a currency repository that may accept excess funds or may be able to dispense funds for deposit in an ITM that is insufficiently funded). In certain embodiments, currency flow module 212 may be configured to send a notification to financial service system 102 requesting service of ITM 101. The service request may include an indication of the specific service needed (e.g., request for excess funds to be removed or additional funds be input). Such a request to financial service system 102 may be made in addition to or in lieu of checking other connected ITMs 101 for the required additional space or currency.

Item database 213 may be controlled by a memory controller device or software, such as document management systems, Microsoft SQL databases, SharePoint databases, Oracle™ databases, Sybase™ databases, or other relational databases. Item database 213 may store identification and pricing data about items for sale. A non-limiting list of the data that may be stored in item database 213 may include: the retail price of an item, the amount of sales tax to be levied on the item, a category for the item (e.g., categorizing the item as food or non-taxable, etc.), special taxes levied on the item, any discounts to be applied to the item, etc. Item database 213 may also store data related to the inventory system of the business, allowing the business to track sales, track inventory, make projections related to sales, etc. One of ordinary skill in the art would understand the data that would be beneficial to store in item database 213.

As discussed above, one of ordinary skill in the art would understand that the ITM 101 may also enable customers of the financial service provider associated with financial service system 102 to make deposits and withdrawals unrelated to purchase transactions. ITM 101 may also allow other payment options for transactions (e.g., enabling purchases via credit card, debit card, check, etc., or a combination thereof). One of ordinary skill in the art would also understand that ITM 101 may be operated, for example, by an employee of the business (e.g., the casher) or, as a further example, it may be configured to operate as a self-service system (e.g., allowing the business customers to purchase items without or with minimal intervention by a cashier).

Figure 3:
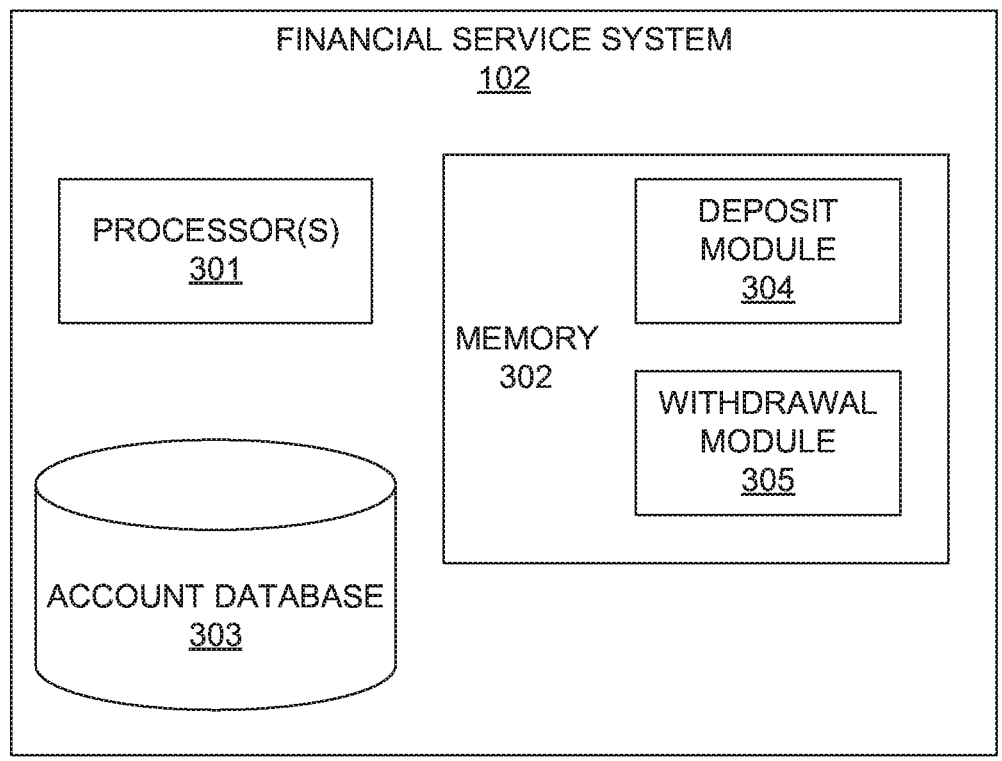
FIG. 3 is an exemplary financial service system configured to provide one or more aspects of the disclosed embodiments.

FIG. 3 is an exemplary financial service system 102, consistent with disclosed embodiments. Financial service system 102 may include processor(s) 301, configured to execute the instructions contained in one or more memories 302. Financial service system 104 may include account database 303. In certain embodiments, account information database 303 may be configured to store information about financial accounts for businesses (e.g., the business associated with ITM 101) and customers (e.g., individuals with financial accounts with the financial service provider associated with financial service system 102). Financial account information may include information such as account numbers, routing numbers, PIN or other confirmation information (e.g., for confirming that user-entered confirmation information is correct), account balances, limits on account withdrawals and/or deposits, account history information, etc.

In certain embodiments, memory 302 may include software components that, when executed by processor(s) 301, may perform one or more processes consistent with the disclosed embodiments. For example, memory 302 may include deposit module 304, which may include software instructions executable by one or more processors, such as processor(s) 301. When executed, the software instructions for deposit module 304 may provide features related to receiving a request for an account deposit (e.g., from ITM 101 via network 103), matching the received information to an existing account (e.g. an account number within account information database 303), making the deposit, and transmitting a confirmation message (e.g. to ITM 101 via network 103).

Memory 302 may also include withdrawal module 305, which may include software instructions executable by one or more processors, such as processor(s) 301. When executed, the software instructions for withdrawal module 305 may provide features related to receiving a request for an account withdrawal (e.g., from ITM 101 via network 103), matching the received information to an existing account (e.g. an account number within account information database 303), verifying that enough funds exist for the withdrawal within the account (e.g. by checking the account balance via account information database 303), deducting the withdrawal amount from the account, and transmitting a confirmation message back to the requesting system (e.g. to ITM 101 via network 103).

Figure 4:
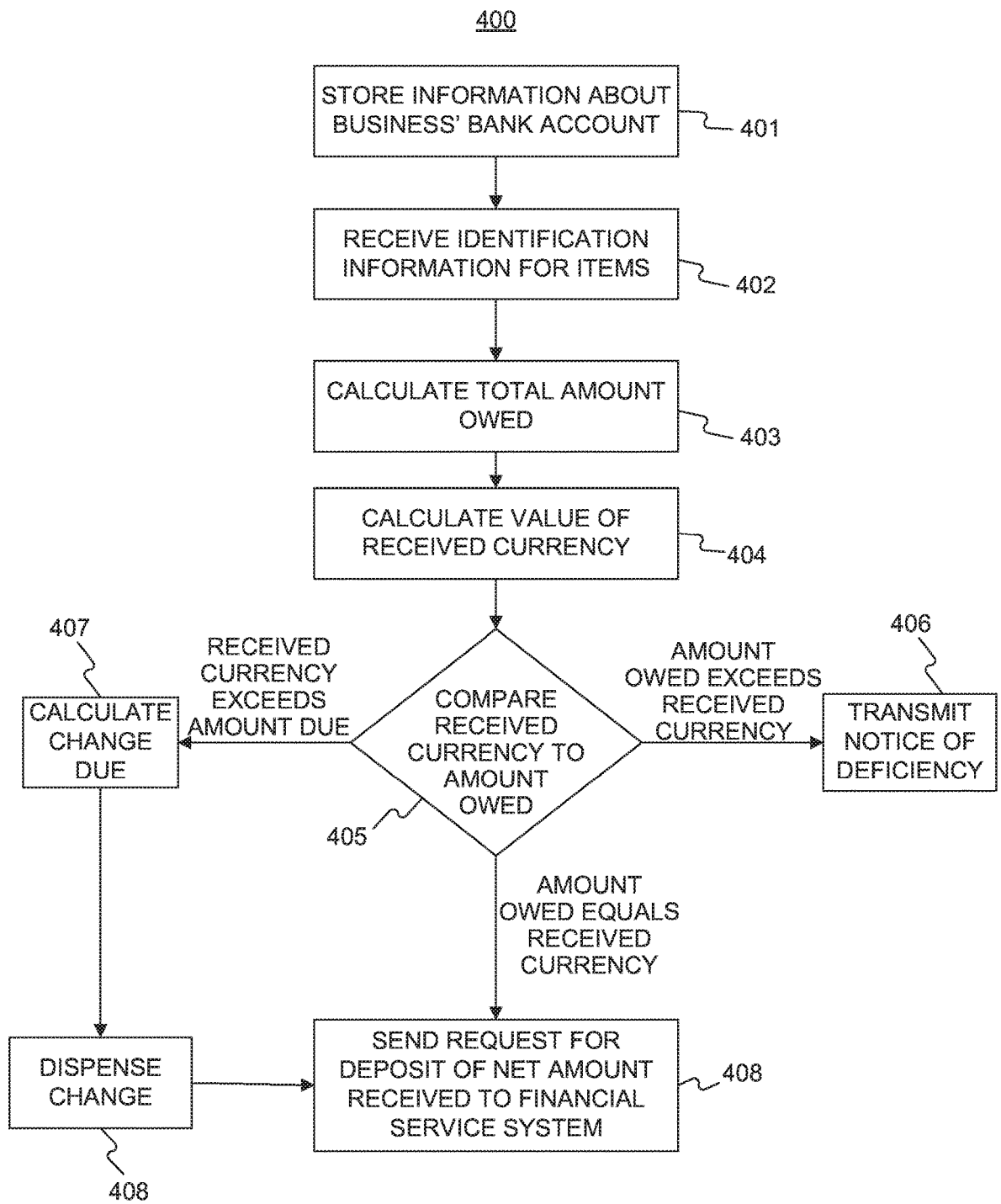
FIG. 4 is a flowchart of an exemplary process for receiving currency as payment in a purchase transaction and sending a request for a deposit to a financial service system.

FIG. 4 is a flowchart of an exemplary process 400 for receiving currency as payment in a purchase transaction and sending a request for a deposit to a financial service system.

At step 501, ITM 101 (e.g., financial account module 211) may receive and store the information about the account of the business that may be transmitted with requests for deposits or withdrawals to financial service system 102. In certain embodiments, this information may be account information (e.g., account and routing numbers for the business' financial account). In certain embodiments, this information may be other identification information that may allow financial service system 102 to recognize and associate requests with the business' financial account. In certain embodiments, ITM 101 may receive and store confirmation information (e.g., the PIN number(s) that cashiers must enter before certain requests may be transmitted).

At step 402, a customer of the business may attempt to make a purchase, and identification information about the item(s) to be purchased may be received by ITM 101 (e.g., via user interface components 101). At step 403, ITM 101 (e.g., transaction module 208) may calculate the total amount owed for the item(s) to be purchased, for example, based at least in part on information stored in item database 213. In certain embodiments, a user may enter the amount due for the items to be purchased, and in such embodiments, identification information for the items, retrieval of information from item database 213, and/or calculation of the total amount due may be unnecessary.

ITM 101 may transmit notification of the amount owed to the user and/or the customer of the business, for example, via user interface components 206 (step not shown). The customer may attempt to pay for the item(s) with currency, and the currency may be inserted into ITM 101 (e.g., by the customer or user via currency acceptor 203). At step 404, ITM 101 (e.g., currency verification module 209) may count the amount of currency received. ITM 101 may also verify that one or more units of currency is valid (e.g., not counterfeit). In certain embodiments, only certain units of currency may be checked for validity. For example, only $50 or $100 bills may be checked for validity. ITM 101 may also verify that one or more units of currency is of sufficient quality (e.g., not damaged) to be stored for later withdrawal by ITM 101. If a unit is not valid or not of sufficient quality, the unit may be returned or may be stored in a rejection repository. ITM 101 may be configured with more than one rejection repository. For example, ITM 101 may be configured with a rejection repository for invalid currency, (for example, to remove counterfeit bills from circulation) and a rejection repository for poor quality units (for example, to remove damaged legal tender that may be valid but may cause, for example, a potential malfunction when handled by currency dispenser 204, currency repository 205, etc.). If a unit of insufficient quality is stored by ITM 101 (e.g., in the rejection repository) the value of unit may still be used in calculating the value of the received currency, but a unit that is found invalid (e.g., counterfeit) may not be included in the value of the received currency.

ITM 101 may verify whether the value received satisfies the total amount owed by the customer for the purchase (step 405). If the customer has not supplied enough valid currency (e.g., "amount owed exceeds received currency," step 405), ITM 101 may transmit a notification of the deficiency (step 406). In certain embodiments, ITM 101 may wait for additional currency to be received or for an item to be removed from the transaction to reduce the total amount owed, thereby returning to step 405 and proceeding with the process once the currency received meets or exceeds the amount due. In certain embodiments, ITM 101 (e.g., currency verification module 409) may be configured to transmit notification that the balance due may be paid by other methods, e.g., via credit or debit card. That is, the customer may reduce the amount due by paying for part of the amount due via another payment method. Thus, the transaction may return to step 405, allowing the process to continue once the currency received met or exceeded the amount due.

At step 405, if the customer has supplied more than enough currency to pay for the transaction (e.g., "received currency exceeds amount due," step 405), ITM 101 (e.g., change-making module 210) may calculate the change due to the customer (step 407). In certain embodiments, step 405 and 407 may be combined. That is, in comparing the amount of received currency to the amount owed, the change due may be automatically calculated. ITM 101 (change-making module 210) may dispense the change due to the customer, for example, via currency dispenser 204 (step 408). The currency dispensed may be obtained from currency depository 205, thereby recycling currency and minimizing the frequency of servicing required by the ITM.

If the customer has supplied exact change (e.g., "amount owed equals received currency," step 405) or has supplied more than enough currency (e.g., resulting in change due to the customer), ITM 101 may send a request to financial service system 102 to deposit the net amount received (e.g., which is generally equal to the amount owed) into the financial account of the business. As discussed above, other deposit/transaction configurations are contemplated, and the example provided with respect to FIG. 4 regarding the deposit of the net amount received associated with a single transaction is one of many configurations of ITM 101. The deposit request may be accompanied by the stored information about the business's financial account. In certain embodiments, ITM 101 may require the user to enter confirmation information (e.g., a PIN or other confirming code), and ITM 101 may verify that the confirmation information matches previously stored confirmation information before transmitting the request. In certain embodiments, ITM 101 may transmit user-entered confirmation information with the request without verifying that the confirmation information matches previously stored confirmation information. In such systems, the confirmation information may be confirmed, for example, by financial service system 102. Such user-entered confirmation information and verification may also be used with other requests, such as non-purchase transaction associated deposits, purchase transaction associated withdrawals, and non-purchase transaction associated withdrawals.

In certain embodiments, instead of a single deposit of the net amount received for a single purchase transaction (e.g., instead of step 408), two transactions may be requested (steps not shown). That is, when the amount of currency received meets or exceeds the amount due, a request to deposit the amount received into the financial account of the business may be sent to financial service system 102, and a request to withdraw the change due from the account of the business may be sent to financial service system 102. The request to withdraw the change due may be approved by financial service system 102, and the change due may be dispensed (e.g., via currency dispenser 204). The dispensed currency may be obtained from currency depository 205, thereby recycling currency and minimizing the frequency of servicing required by ITM 101. As discussed above, other deposit/transaction configurations are contemplated, and this example regarding both a deposit and a withdrawal request associated with a single transaction is one of many configurations of ITM 101.

In certain embodiments, financial service system 102 may transmit confirmation that the requested deposit and/or withdrawal has been appropriately credited and/or debited to the financial account of the business.

One of ordinary skill in the art would understand that certain steps of process 400 may be performed in a different order and/or omitted entirely.

Figure 5:
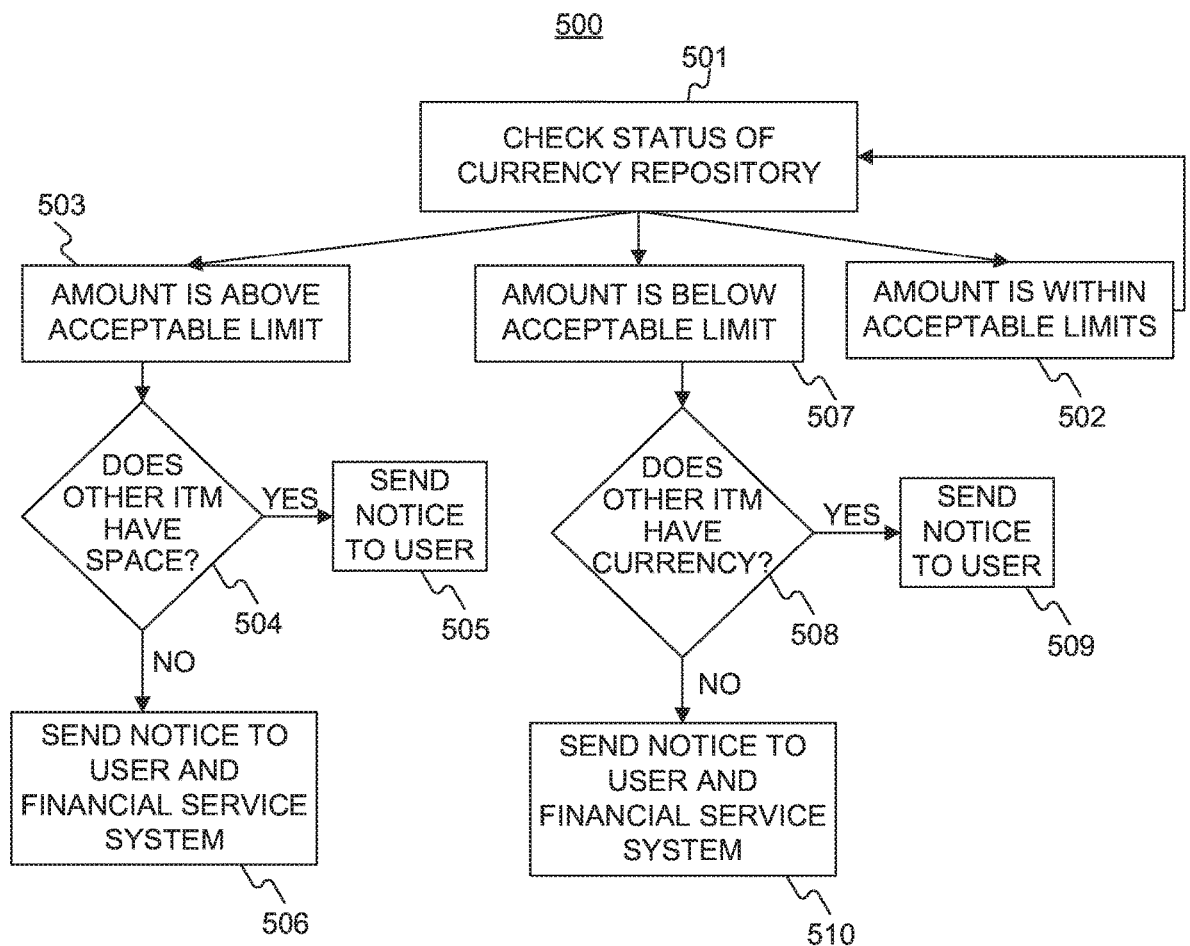
FIG. 5 is a flowchart of an exemplary process for managing currency flow within a system comprising more than one ITM.

FIG. 5 is a flowchart of an exemplary process for managing currency flow within a system comprising more than one ITM.

At step 501, ITM 101 (e.g., currency flow module 212) may check the status of currency repository 205. This status check may be conducted periodically (e.g., every hour, every day, etc.) and/or may be conducted upon the occurrence of a triggering event (e.g., upon receipt of a request from another ITM 101 to check status, when the ITM is booted or activated, after every transaction, as soon as the previous check is completed, etc.). In certain embodiments, ITM 101 may be configured to keep a running tally of the amount of cash deposited or withdrawn to determine if the total reaches an upper or lower limit. If the amount of currency within the repository is within acceptable limits (step 502) and/or if the amount of each denomination of currency is within acceptable limits, ITM 101 may not send out any notifications and may wait for the next designated time or event to check the status of the repository.

If currency repository 205 is too full and the amount of currency is above an acceptable limit and/or if the amount of one or more denominations of currency is above acceptable limits (step 503), ITM 101 (e.g., currency flow module 212) may transmit a request to one or more other ITMs connected (e.g., via network 103) to ITM 101 (step 504). The request may prompt the one or more other ITMs (e.g., the currency flow modules of the other ITMS) to check the space available in their respective currency repositories to determine if they have sufficient space to accept the excess currency from ITM 101. The request may be sent to the other ITMs sequentially until an ITM with surplus space is found, or the request may be sent to all connected ITMs simultaneously. ITM 101 (e.g., currency flow module 212) may receive the response(s) from the one or more other ITMs.

If one or more of the other ITMs has sufficient space for the excess currency ("Yes," step 504), then ITM 101 and/or the ITM with sufficient space may transmit a notification to the user (step 505), which may prompt the user to withdraw currency from ITM 101 and deposit currency into the one or more other ITMs with sufficient space. The request to withdraw currency from ITM 101 may be transmitted to financial service system 102 (e.g., from financial account module 211), and ITM 101 may be configured to await notification from financial service system 102 that the withdrawal is approved before dispensing the currency. When the currency is deposited into the one or more ITMs with sufficient space, a deposit request may be transmitted to financial service system 102 (e.g., from financial account module 211).

If none of the other ITMs has sufficient space for the excess currency from ITM 101 ("No," step 504), then ITM 101 may transmit a notification to the user and/or may transmit a notification to financial service system 102 (step 506). The notice may be a message displayed via one or more of the user interface components. The notice to the user may indicate that the amount of currency in ITM 101 is above acceptable limits and that no other connected ITM has space for the excess currency. The notice to the user may also indicate that ITM 101 is unable to accept or will soon be unable to accept additional currency. Such a notification may prompt the user to withdraw currency from ITM 101 (for which a request may be transmitted to and the withdrawal may be approved by financial service system 102). Even though the withdrawn currency may not be physically deposited in the other connected ITMs, the withdrawal may keep ITM 101 operational (e.g., accepting further deposits), possibly until the next servicing of ITM 101 by the financial service provider. The notice to financial service system 102 may indicate that the amount of currency in ITM 101 is above acceptable limits and that no other connected ITM has space for the excess currency. Such a notification may prompt the financial service provider to service the ITM.

If the amount of currency in currency repository 205 is below acceptable limits and/or if the amount of one or more denominations of currency is below acceptable limits (step 507), ITM 101 (e.g., currency flow module 212) may transmit a request to one or more other ITMs connected (e.g., via network 103) to ITM 101 (step 508). The request prompts the one or more other ITMs (e.g., the currency flow modules of the other ITMS) to check the amount of currency available in their respective currency repositories to determine if they have sufficient currency to dispense for subsequent deposit into ITM 101. The request may be sent to the other ITMs sequentially until an ITM with surplus currency is found, or the request may be sent to all connected ITMs simultaneously. ITM 101 (e.g., currency flow module 212) may receive the response(s) from the one or more other ITMs.

If one or more of the other ITMs has sufficient currency to dispense and/or deposit into ITM 101 ("Yes," step 508), ITM 101 and/or the ITM with sufficient space may transmit a notification to the user (step 509), which may prompt the user to withdraw currency from the one or more other ITMs with sufficient currency and deposit the currency ITM 101. The notice may be a message displayed and/or printed via one or more of the user interface components. The notice may include an indication of the amount and/or denominations to withdraw, which other ITM should be used for the withdrawal, etc. ITM 101 may also generate and/or print a code (e.g., an alpha-numeric code, a bar code, a QR code, etc.) that the other ITM(s) may receive as part of a request for withdrawal (e.g., the other ITM(s) may receive the code as user input, and the appropriate amount/denominations may be dispensed, the other ITM(s) may scan the code and dispense the appropriate amount/denominations, etc.).

The request to withdraw currency from the one or more other ITMs may be transmitted to financial service system 102 (e.g., from financial account module 211), and the one or more other ITMs may be configured to await notification from financial service system 102 that a withdrawal is approved before dispensing the currency. When the currency is deposited into ITM 101, a deposit request may be transmitted to financial service system 102 (e.g., from financial account module 211).

If none of the other ITMs has sufficient currency to dispense for deposit into ITM 101 ("No," step 508), ITM 101 may transmit a notification to the user and/or to financial service system 102 (step 510). The notice to the user may be a message displayed via one or more of the user interface components. The notice to the user may indicate that the amount of currency in ITM 101 is below acceptable limits and may also indicate that no other connected ITM has excess currency to withdraw for deposit into ITM 101. The notice to the user may also indicate that ITM 101 is unable to accept or may soon be unable to accept additional withdrawals. Such a notification may prompt the user to withdraw currency from another source (e.g., to make a trip to the bank to withdraw additional currency) for deposit into ITM 101. The notice to financial service system 102 may indicate that the amount of currency in ITM 101 is below acceptable limits and may also indicate that no other connected ITM has sufficient currency to dispense for deposit in ITM 101. Such a notification may prompt the financial service provider to service the ITM.

Other features and functionalities of the described embodiments are possible. For example, caps may be implemented for various types of withdrawals and/or deposits. The caps may be set by the business and/or by the financial service provider associated with financial service system 102. Different types of withdrawals and/or deposits may be associated with different caps. For example, user-initiated non-purchase transaction related withdrawal may not exceed $100 unless the withdrawal was prompted by a notification from a currency flow module. Caps may also be associated with certain denominations of currency. For example, no $100 bills may be accepted by ITM 101. Caps may further be associated with certain types of transactions in conjunction with certain denominations and or other acceptance rules. For example, $100 bills may not be accepted unless received in association with a purchase transaction for item(s) that exceed $75 and, optionally, if the $100 is verified (e.g., via currency verification module 209). Caps may also be implemented if ITM 101 is too full or insufficiently funded. For example, ITM 101 may only permit purchase transactions and/or allow deposits or withdrawals if there is space in currency repository 205 to accept the received currency or the anticipated received currency (e.g., for deposits) or if there is sufficient funds to dispense currency (e.g., to make change and/or for withdrawals).

The ability to cap the amount of currency dispensed provides an advantage over other point of sale systems. For example, cash register systems typically expose all received cash in the register during for each transaction and any time a cashier requests that the register be opened. By exposing all received cash, the cash register system puts all received currency is at risk, for example, of theft. Because the currency in the currency repository can be considered the property of the financial service provider, and only the amounts of withdrawal requested and approved by the financial service provider (e.g., financial service system 102), the amount of currency exposed and at risk of theft can be capped and minimized. The caps may be set by either the business or the financial service provider.

As another example, in certain embodiments, ITM 101 may be capable of receiving and dispensing bills and coins. In certain embodiments, ITM 101 may be configured to only receive and dispense bills, and coin change may be handled by a separate system. The separate coin-handling system may be integrated into the ITM to varying degrees. One of ordinary skill in the art would understand advantageous configurations for the handling of coin currency.

As further examples, the processes of FIGS. 4 and 5 are not limited to the sequences described above. Variations of these sequences, such as the removal and/or the addition of other process steps may be implemented without departing from the spirit and scope of the disclosed embodiments.

Additionally, the disclosed embodiments may be used by various types of users. Any person or entity with a financial account may find an ITM beneficial and ITM use is not restricted to businesses. The disclosed embodiments may also be applied to different types of accounts. Any financial account for individuals or business entities may employ systems, methods, and articles of manufacture consistent with certain principles related to the disclosed embodiments.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but are instead defined by the appended claims in light of their full scope of equivalents.

What is claimed is:

1. A point-of-sale system, comprising:
   a plurality of first point-of-sale machines; and
   a second point-of-sale machine, comprising:
      a currency repository holding an amount of currency;
      at least one memory storing instructions; and
      at least one processor configured to execute the stored instructions to perform operations comprising:
         determining that the amount of currency in the currency repository is above a currency threshold;
         identifying one of the first point-of-sale machines that has currency repository space available to accept currency; and
         displaying a notification indicating an identity of the identified one of the first point-of-sale machines.

2. The system of claim 1, wherein the operations comprise:
   receiving a request to dispense currency.

3. The system of claim 1, wherein the second point-of-sale machine further comprises:
   a currency acceptor configured to receive currency; and
   a currency dispenser configured to dispense currency.

4. The system of claim 3, wherein the operations further comprise:
   determining that a value of currency received exceeds a sales amount by a change-due amount;
   dispensing currency equal in value to the change-due amount from the currency repository via the currency dispenser; and
   storing the received currency in the currency repository.

5. The system of claim 1, wherein the operations further comprise:
   receiving a request to withdraw currency from the second point-of-sale machine; and
   transmitting the request to withdraw to a financial service system for approval.

6. The system of claim 1, wherein the operations further comprise:
   receiving, from the financial service system, an approval of the request to withdraw; and
   dispensing currency, based on the request to withdraw, via the currency dispenser.

7. The system of claim 1, wherein the operations further comprise:
   determining that none of the first point-of-sale machines has currency repository space available; and
   based on the determination, notifying a financial service system that none of the first point-of-sale machines has currency repository space available.

8. The system of claim 1, wherein the operations further comprise:
   determining that the amount of currency in the currency repository is below a second currency threshold;
   identifying a first one of the point-of-sale machines that has an available amount of currency above the second currency threshold; and
   displaying a notification indicating an identity of the identified first one of the first point-of-sale machines that has an available amount of currency above the second currency threshold.

9. The system of claim 1, wherein identifying a first one of the first point-of-sale device machines comprises:
   transmitting a verification request to one of the first point-of-sale machines to verify availability of currency repository space to accept currency; and
   receiving a verification, from the one of first point-of-sale machines, indicating that the one of the first point-of-sale machines has currency repository space available to accept currency.

10. The system of claim 9, wherein transmitting the verification request comprises sequentially transmitting the verification request to a plurality of the first point-of-sale machines.

11. The system of claim 9, wherein transmitting the verification request comprises simultaneously transmitting the verification request to a plurality of the first point-of-sale machines.

12. A system, comprising:
    a plurality of first point-of-sale machines; and
    a second point-of-sale machine comprising:
       a currency repository holding an amount of currency;
       at least one memory storing instructions; and
       at least one processor configured to execute the stored instructions to perform operations comprising:
          determining that the amount of currency in the currency repository is below a currency threshold;
          identifying a first one of the first point-of-sale machines that has available currency to dispense; and
          displaying a notification indicating an identify of the identified first one of the first point-of-sale machines.

13. The system of claim 12, wherein the operations further comprise:
    receiving a request to withdraw currency from the second point-of-sale machine;
    determining that the amount of currency in the currency repository is above the currency threshold; and
    transmitting, to a financial service system, a request for approval of the request to withdraw.

14. The system of claim 13, wherein the operations further comprise:
    receiving, from the financial service system, an approval of the request to withdraw; and
    dispensing currency via a currency dispenser, based on the request to withdraw.

15. The system of claim 12, wherein the operations further comprise:
    determining that none of the first point-of-sale machines has available currency to dispense; and
    upon determining that none of the first point-of-sale machines has available currency to dispense, notifying a financial service system that none of the first point-of-sale machines has available currency to dispense.

16. The system of claim 12, wherein:
the second point-of-sale machine further comprises:
- a currency acceptor configured to receive currency; and
- a currency dispenser configured to dispense currency; and the operations further comprise:
- determining that a value of currency received exceeds a sales amount by a change-due amount;
- dispensing currency equal in value to the change-due amount from the currency repository via the currency dispenser; and
- storing the received currency in the currency repository.

17. The system of claim 12, wherein identifying a first one of the first point-of-sale machines comprises:
- transmitting a verification request to one of the first point-of-sale machines to verify availability of currency to dispense; and
- receiving a verification, from the one of first point-of-sale machines, indicating that the one of the first point-of-sale machines has available currency to dispense.

18. The system of claim 17, wherein transmitting the verification request comprises sequentially transmitting the verification request to a plurality of the first point-of-sale machines.

19. The system of claim 17, wherein transmitting the verification request comprises simultaneously transmitting the verification request to a plurality of the first point-of-sale machines.

20. A computer-implemented method comprising:
- determining, by a first point-of-sale machine, that an amount of currency in a currency repository of the first point-of-sale machine is one of above a first threshold or below a second threshold;
- upon determining that the amount of currency is above the first threshold:
  - identifying a second point-of-sale machine that has currency repository space available; and
  - displaying a first notification indicating the identity of the identified second point-of-sale device machine; and
- upon determining that the amount of currency is below the second threshold:
  - identifying a third point-of-sale machine that has available currency to dispense; and
  - displaying a second notification indicating the identity of the identified third point-of-sale machine.

\* \* \* \* \*